(12) United States Patent
Narumi et al.

(10) Patent No.: US 11,942,890 B2
(45) Date of Patent: Mar. 26, 2024

(54) SEMICONDUCTOR DEVICE, MOTOR DRIVE SYSTEM, AND METHOD OF STARTING MOTOR

(71) Applicant: RENESAS ELECTRONICS CORPORATION, Tokyo (JP)

(72) Inventors: Satoshi Narumi, Tokyo (JP); Minoru Kurosawa, Tokyo (JP); Takeshi Ohtsuki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/479,185

(22) Filed: Sep. 20, 2021

(65) Prior Publication Data

US 2022/0103100 A1    Mar. 31, 2022

(30) Foreign Application Priority Data

Sep. 30, 2020   (JP) ................... 2020-165185

(51) Int. Cl.
*H02P 6/182* (2016.01)
*H02P 6/20* (2016.01)

(52) U.S. Cl.
CPC ............ *H02P 6/182* (2013.01); *H02P 6/20* (2013.01); *H02P 2203/03* (2013.01)

(58) Field of Classification Search
CPC ........ H02P 6/182; H02P 6/20; H02P 2203/03; H02P 6/185; H02P 6/00; H02P 6/007; H02P 6/08; H02P 6/12; H02P 6/14; H02P 6/15; H02P 6/153; H02P 6/157; H02P 6/16; H02P 6/18; H02P 6/24; H02P 6/28; H02P 6/32; H02P 7/28; H02P 7/29; H02P 21/00; H02P 21/18; H02P 21/32; H02P 23/00; H02P 23/07; H02P 25/022; H02P 25/089; H02P 25/107; H02P 27/00; H02P 27/04; H02P 27/06; H02P 27/08
See application file for complete search history.

(56) References Cited

U.S. PATENT DOCUMENTS 7,723,937 B2    5/2010   Kurosawa et al.
2008/0100243 A1*  5/2008  Kurosawa ............... H02P 6/182
                                                   318/430

(Continued)

FOREIGN PATENT DOCUMENTS

JP            2008-113506 A       5/2008

*Primary Examiner* — Antony M Paul
(74) *Attorney, Agent, or Firm* — Rimon P.C.

(57) ABSTRACT

The magnetic pole position of the rotor is estimated with high accuracy at the initial start of a three-phase motor of the sensorless system. Semiconductor device for driving and controlling the three-phase motor of the sensorless system have a detector connected to the three-phase output nodes of the inverter circuit and the virtual neutral point (or neutral point), and detecting a voltage generated in the output node of the non-energized phase of the three-phase. Controller applies the initial drive voltage by the inverter circuit to any two phases of the three-phase motor based on the estimated position of the magnetic pole of the rotor in the stop state. Controller estimates the position of the rotor based on a difference voltage detected by the detector in a driving voltage applying period and a regeneration period immediately after or immediately before the driving voltage applying period.

16 Claims, 9 Drawing Sheets

(56) References Cited

U.S. PATENT DOCUMENTS

| | | | |
|---|---|---|---|
| 2018/0254722 A1* | 9/2018 | Umetsu | H02P 6/182 |
| 2019/0181783 A1* | 6/2019 | Narumi | H02P 6/187 |
| 2020/0195181 A1* | 6/2020 | Yoshikawa | G03G 15/5008 |

* cited by examiner

SEMICONDUCTOR DEVICE, MOTOR DRIVE SYSTEM, AND METHOD OF STARTING MOTOR

CROSS-REFERENCE TO RELATED APPLICATIONS

The disclosure of Japanese Patent Application No. 2020-165185 filed on Sep. 30, 2020 including the specification, drawings and abstract is incorporated herein by reference in its entirety.

BACKGROUND

The present disclosure relates to a semiconductor device, a motor drive system, and a method of starting motor. For example, it is suitable for an initial drive of a brushless DC motor with a sensorless system (also referred to as a permanent magnet synchronous motor).

In a sensorless control of a brushless DC motor, back electromotive force (BEMF) generated in a stator winding of a non-energized phase is detected by a rotation of a rotor of the motor. Based on a zero-crossing point of the detected back electromotive force, a position and a rotation speed of the rotor are estimated.

Since the back electromotive force does not occur when the motor is stopped, a state of the rotor of the motor cannot be estimated by sensorless control based on detecting the zero-crossing point of back electromotive force above. Therefore, a magnetic pole position of the rotor is estimated, for example, by using the difference in self-inductance.

Thereafter, the motor is initially driven by applying a drive voltage to a stator winding of the appropriate phase corresponding to the estimated initial magnetic pole position for a predetermined time. The initial drive is executed a plurality of times while switching the phase for applying the drive voltage. When a sufficiently amount of the back electromotive force is detected, the motor control shifts to sensorless control based on detecting the zero-crossing point of back electromotive force.

There are disclosed techniques listed below.
[Patent Document 1] Japanese Unexamined Patent Application Publication No. 2008-113506.

Patent Document 1 discloses a method for estimating the position of the rotor during the initial drive in order to shorten a start-up time of the motor. Specifically, the motor drive control device of patent document 1 detects a peak value of a induced voltage generated in the stator winding of the non-energized phase by mutual induction with the stator winding of the energized phase. Then, the motor drive control device switches the energized phase based on comparing the peak value and a threshold value of the detected induced voltage.

SUMMARY

In the motor starting method disclosed in patent document 1, it is difficult to set a threshold for comparing with the peak value of induced voltage. The reason for this is that the voltage generated in the non-energized phase includes, a little induced voltage based on back electromotive force in addition to the induced voltage caused by mutual induction. Further, a magnitude of the induced voltage generated by mutual induction is large due to an individual difference by the motor. Therefore, it is difficult to accurately detect the position of the rotor.

Other objects and novel features will become apparent from the description of this specification and the accompanying drawings.

Semiconductor device according to an embodiment, at the time of initial start of the motor, the semiconductor device detects a difference between a voltage generated in the non-energized phase during a drive voltage applying period, and a voltage generated in the non-energized phase during a regeneration period immediately after or before the drive voltage applying period. The semiconductor device estimates the magnetic pole position of the rotor based on the detected differential voltage.

According to the above-described embodiment, at the time of initial start of the motor, the magnetic pole position of the rotor can be estimated with high accuracy without being affected by the individual difference of back electromotive force and the motor.

DETAILED DESCRIPTION

Hereinafter, embodiments will be described in detail with reference to the drawings. The same or corresponding portions are denoted by the same reference numerals, and description thereof will not be repeated.

Overall Configuration of a Motor Drive System

Figure 1:
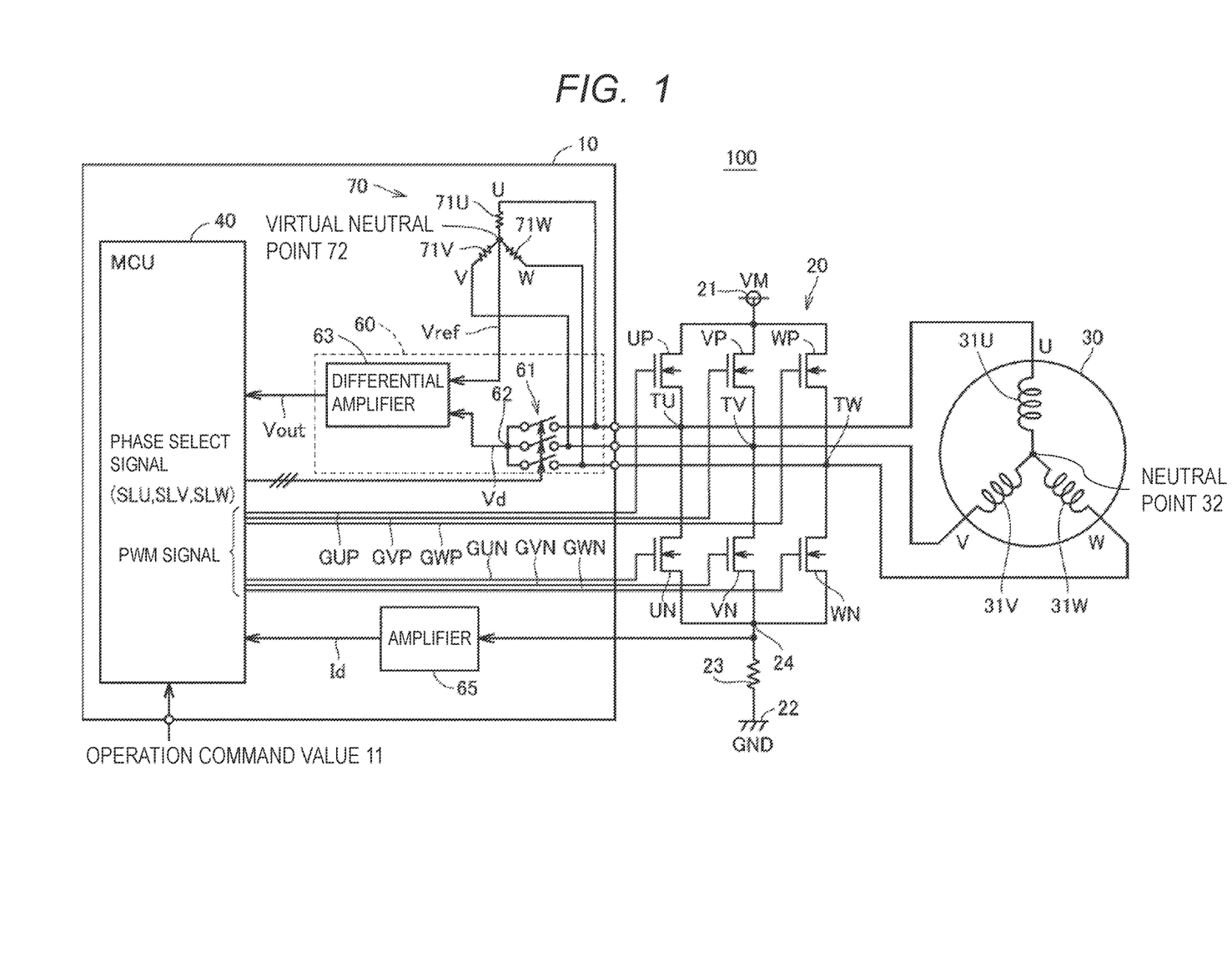
FIG. 1 is a block diagram showing an example of a configuration of a motor drive system.

FIG. 1 is a block diagram showing an example of a configuration of a motor drive system. Referring to FIG. 1, a motor drive system 100 includes a three-phase brushless DC motor 30, an inverter circuit 20, and a semiconductor device 10 for controlling the inverter circuit 20.

1. Brushless DC Motor

The brushless DC motor 30 includes a Y-connected stator windings 31U, 31V, 31W, and a rotor having one or more pole pairs (not shown). The rotor is driven to rotate in synchronization with a three-phase AC supplied from the inverter circuit 20 to the stator windings 31U, 31V, 31W. A node of the stator windings 31U, 31V, 31W is referred to as a neutral point 32.

In the following, the case where the stator windings 31 is Y-connection is shown in FIG. 1, but a technology of the present disclosure has the same effect when the stator windings 31 is Δ-connection.

2. Inverter Circuit

The inverter circuit 20 includes MOS (Metal Oxide Semiconductor) transistor UP, UN, VP, VN, WP, and WN.

The MOS transistor UP is provided on a U-phase upper arm, and the MOS transistor UN is provided on a U-phase lower arm. The MOS transistor VP is provided on a V-phase upper arm, the MOS transistor VN is provided on a V-phase lower arm. The MOS transistor WP is provided on a W-phase upper arm, the MOS transistor WN is provided on a W-phase lower arm. The upper arm is also referred to as the high side, and the lower arm is also referred to as the low side.

Further, the inverter circuit 20 includes a shunt resistor 23 for detecting a current between the two phases.

The following is a brief description of these connections. The MOS transistor UP and the MOS transistor UN is connected in series between a first power supply node 21 and a connection node 24 in this arrangement order, the first power supply note 21 being supplied to an external input voltage VM (also referred to as a power supply voltage VM) and the node 24 connection being provided at low-potential side. The shunt resistor 23 is connected between the connection node 24 and a second power supply node 22 which provides a ground voltage GND. The output node TU is a connection node between the MOS transistor UP and the MOS transistor UN. The output node TU is connected to one end of the U-phase stator winding 31U.

Similarly, the MOS transistor VP and the MOS transistor VN are connected in series between the first power supply node 21 and the connection node 24 in this arrangement order. The output node TV is a connection node between the MOS transistor VP and the MOS transistor VN. The output node TV is connected to one end of the V-phase stator winding 31V.

Similarly, the MOS transistor WP and the MOS transistor WN are connected in series between the first power supply node 21 and the connection node 24 in this arrangement order. The output node TW is a connection node between the MOS transistor WP and the MOS transistor WN. The output node TW is connected to one end of the W-phase stator winding 31W.

Each of the MOS transistor UP, UN, VP, VN, WP, WN has a reverse-biased body diode (not shown) connected in parallel. Therefore, when both the transistor of the upper arm and the lower arm on the same phase are in off state, a regeneration current flows through the body diodes.

In FIG. 1, All MOS transistors UP, UN, VP, VN, WP, WN are composed of N-channel MOS transistors. Alternatively, either of MOS transistors UP, VP, WP of the upper arm and the MOS transistors UN, VN, WN may be NMOS. In this case, the other MOS transistors are PMOS. Alternatively, all of the MOS transistor UP, UN, VP, VN, WP, WN may be composed of P-channel MOS transistors.

Further, other types of field effect transistors may be used as a semiconductor switching element composing the inverter circuit 20 instead of the MOS transistor. Alternatively, a bipolar transistor or Insulated Gate Bipolar Transistor (IGBT) may be used instead of the MOS transistor. However, when other types of transistors are used, it is necessary to connect a flywheel diode in anti-parallel with each transistor. The reason for this is to allow the current to flow through regeneration pass when both the transistors of the upper arm and the lower arm on the same phase are the off state.

3. Semiconductor Device

The semiconductor device 10 includes a switch circuit 61, a virtual neutral point generating circuit 70, a differential amplifier 63, an amplifier 65, a microcontroller unit (MCU) 40. The switch circuit 61 and the differential amplifier 63 configures a detector 60 for detecting the voltage of the output node of the non-energized phase of the inverter circuit 20.

The switch circuit 61 is connected to the output nodes TU, TV, TW. In response to a phase select signals SLU, SLV, SLW outputted from the MCU 40, the switch circuit 61 connects a detection node 62 to one of the output nodes TU, TV, TW corresponding to the selected phase.

The virtual neutral point generating circuit 70 gives a virtual neutral point 72 having a voltage having the same role as the neutral point 32 of the brushless DC motor 30. The virtual neutral point generating circuit 70 includes resistive elements 71U, 71V, 71W. The resistor element 71U is connected between the virtual neutral point 72 and the output node TU. The resistive element 71V is connected between the virtual neutral point 72 and the output node TV. The resistive element 71W is connected between the virtual neutral point 72 and the output node TW. The resistive elements 71U, 71V, 71W have equal resistance value to each other.

The differential amplifier 63 amplifies the difference between the voltage Vd at the detection node 62 and a reference voltage Vref. The voltage of the neutral point 32 or virtual neutral point 72 is used as the reference voltage Vref.

The amplifier 65 amplifies a voltage that occurs in the shunt resistor 23. Thus, it is possible to detect the motor current flowing between U-phase, V-phase and W-phase.

Figure 2:
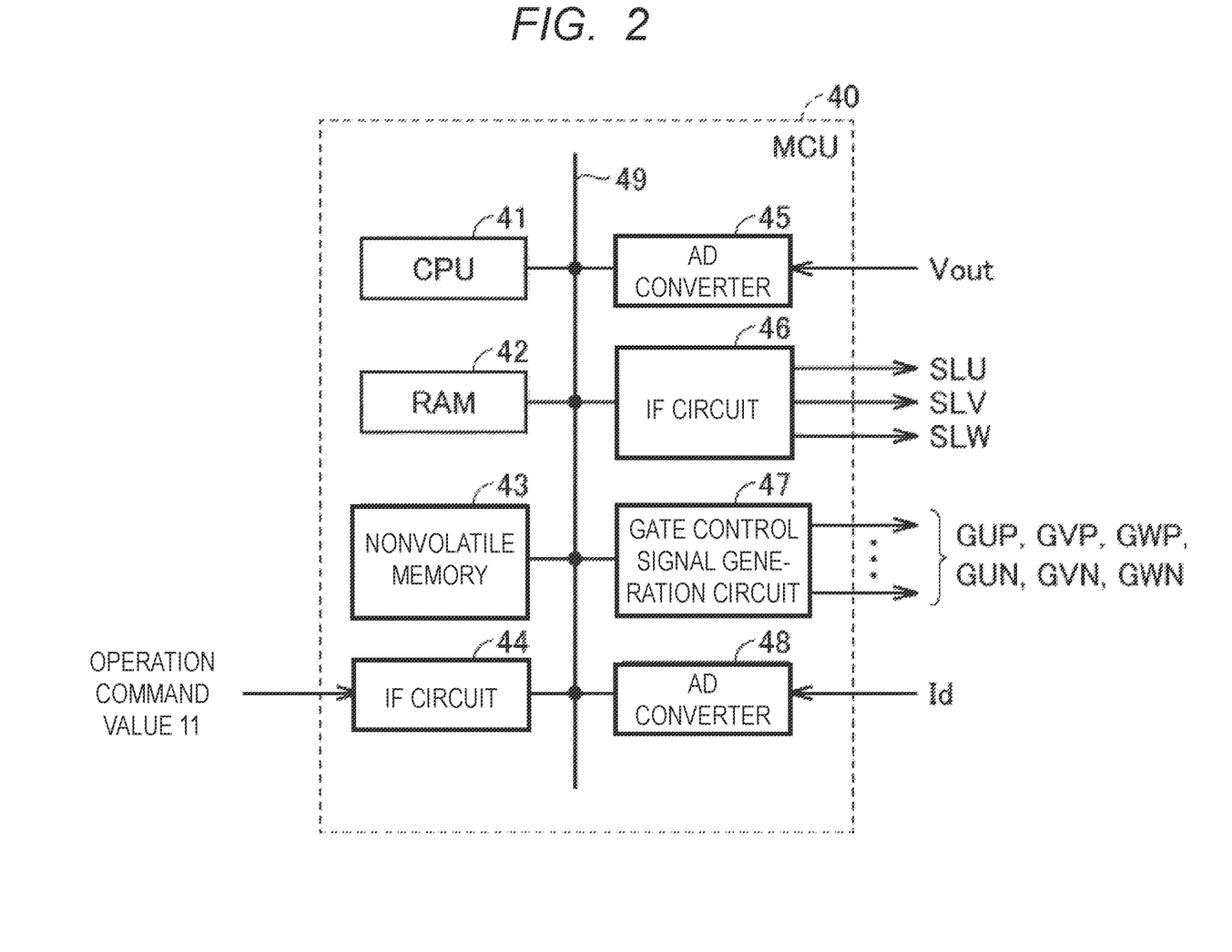
FIG. 2 is a block diagram showing an example of a configuration of an MCU of FIG. 1.

The MCU 40 incorporates a computer including a CPU (Central Processing Unit) and memory into one integrated circuit. The MCU 40 realizes various functions by executing a program stored in the memory. Referring now to FIGS. 1 and 2, the configuration and function of MCU 10 will be described.

FIG. 2 is a block diagram showing a configuration example of the MCU of FIG. 1. In FIG. 2, the MCU 40 is configured by a computer including a CPU (Central Processing Unit) 41, RAM (Random Access Memory) 4, and a nonvolatile memory 43.

The MCU 40 further includes interface (IF) circuit 44, 46, analog-to-digital (AD) converters 45, 48, and a gate control signal generation circuit 47. The MCU 40 further includes a bus 49 for interconnecting these components. Two or more components, such as the CPU 41, may be provided.

The CPU 41 operates in accordance with instructions included in programs stored in the nonvolatile memories 43, thereby controlling the entire motor drive system 100. The program may be provided as a non-transitory storage medium or may be provided over a network.

The RAM 42 is used as a main memory in which CPU 41 operates. The nonvolatile memory 43 stores various setting values necessary for the operation of the program and the program. The nonvolatile memory 43 may be a mask ROM (Random Access Memory) or an EEPROM (Electrically Erasable Programmable ROM) or the like. Alternatively, the nonvolatile memory 43 may be a NOR flash memory, a NAND flash memory, or the like. The nonvolatile memory 43 may further includes a SSD (Solid State Drive) or a hard disk.

The IF circuit 44 is a circuit for receiving an input of the operation command value 11 from outside. The IF circuit 46 is a circuit for outputting a phase select signal SLU, SLV, SLW to the switch circuit 61 based on a command from CPU 41. The IF circuits 44 and 46, for example, provide input/output isolation, leveling, and timing adjustment between an internal circuitry of the MCU 40 and an external circuitry.

The AD converter 45 converts an output signal Vout of the differential amplifier 63 to a digital signal. The AD converter 48 converts an output signal Id of the amplifier 65 to a digital signal. The AD converters 45 and 48 may have any known circuit configuration.

The gate control signal generation circuit 47, based on a command from CPU 41, generates a gate control signal GUP, GUN, GVP, GVN, GWP, GWN of the MOS transistor UP, UN, VP, VN, WP, WN. The gate control signal generation circuit 47, for example, generates a gate control signal based on PWM (Pulse Width Modulation) control based on comparing a gate voltage command value of each MOS transistor to a value of a carrier signal.

Instead of the MCU 40 having the above configuration, a controller configured by a dedicated circuit such as ASIC (Application Specific Integrated Circuit) may be used. Alternatively, at least two of ASIC, FPGA (Field Programmable Gate Array, CPU, and the like may be combined to configure a controller.

Energization Pattern

Next, a description will be given of six energization patterns in the case of 120 degrees energization method. In this embodiment, the MCU 40 controls the brushless DC motor 30 by 120 degrees energization method. The 120 degrees energization method uses 120 degrees of an electric angle half cycle as an energization period and remaining 60 degrees of the electric angle half cycle as a de-energization period. The BEMF can be detected in the de-energization period. In a three-phase brushless DC motor, there are six energization patterns since the energized phase is switched every electrical angle 60 degrees.

Note that the disclosed technique can be applied even when the energization period is more than 120 degrees and less than 180 degrees of the electric angle half cycle, as long as the BEMF generated in the non-energization period can be measured.

It should be noted that the energization period and the de-energization period of the above 120 degrees energization method is different from the voltage applying period (also referred to as on period) and the regeneration period (also referred to as off period) of the PWM control. The energization period includes a plurality of voltage applying periods of the PWM control and a plurality of regeneration periods.

Figure 3:
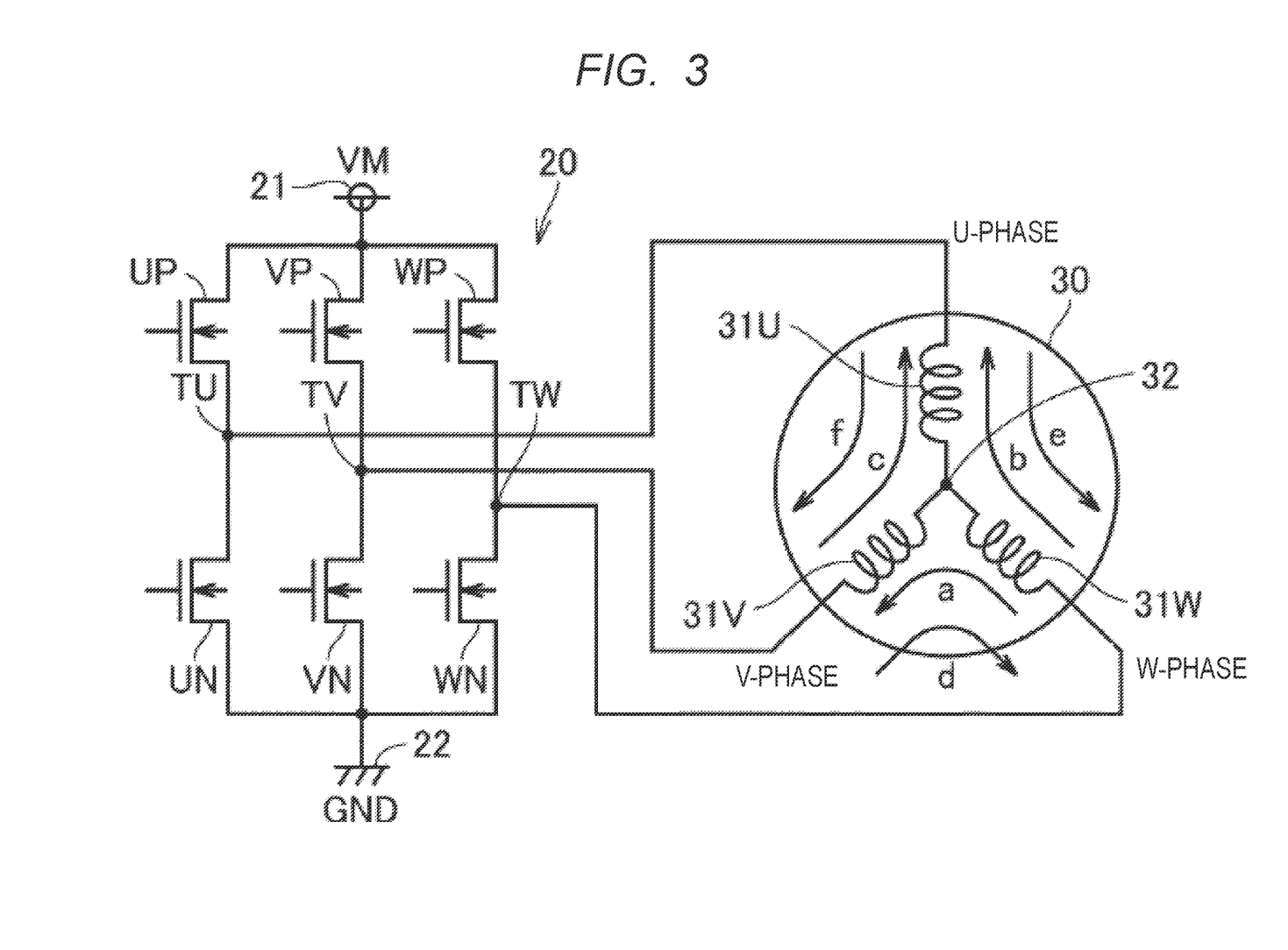
FIG. 3 is a diagram for explaining six energization patterns in the case of 120 degrees energization method.

FIG. 3 is a diagram for explaining the six energization pattern in the case of 120 degrees energization method. In FIG. 3, 6 energization patterns of currents a-f are shown.

(a) Referring to FIG. 3, the MOS transistor WP of a W-phase upper arm and the MOS transistor VN of the V-phase lower arm is controlled to on state, the other transistors are controlled to the off state. Thus, the motor current flows from the W-phase stator winding 31W to the V-phase stator winding 31V. The U-phase stator winding 31U is de-energized and the zero-crossing point of BEMF is observable. In the following description, this energization pattern is referred to as energization pattern a.

Further, in the energization pattern a, the U-phase is referred to as "non-energized phase", the W-phase is referred to as "upstream-side energized phase", the V-phase is referred to as "downstream-side energized phase". Motor current flows in the direction from the stator winding of the upstream-side energized phase to the stator winding of the downstream-side energized phase. The same definition is applied to other energization patterns.

When executing the PWM control in the energization pattern a, the MCU 40 maintains the W-phase upper arm in the on state, and executes the PWM control in the V-phase. Alternatively, the MCU 40 maintains the V-phase lower arm in the on state and executes PWM control in the W-phase. In the former case, the regeneration current flows through the W-phase upper arm and the V-phase upper arm. In the latter case, the regeneration current flows through the W-phase lower arm and the V-phase lower arm.

(b) The MOS transistor WP of the W-phase upper arm and the MOS transistor UN of the U-phase lower arm of the inverter circuit 20 are controlled to the on state, the other transistors are controlled to the off state. Thus, the motor current b flows from the W-phase stator winding 31W to the U-phase stator winding 31U. V-phase stator winding 31V is in the non-energized state, zero-crossing point of BEMF can be observed. In the following description, this energization pattern is referred to as an energization pattern b.

When executing the PWM control in the energization pattern b, the MCU 40 maintains the W-phase upper arm in the on state, executes the PWM control in the U-phase. Alternatively, the MCU 40 maintains the U-phase lower arm in the on state and executes PWM control in the W-phase. In the former case, the regeneration current flows through the W-phase upper arm and the U-phase upper arm. In the latter case, the regeneration current flows through the W-phase lower arm and the U-phase lower arm.

(c) When the MOS transistor VP of the V-phase upper arm and the MOS transistor UN of the U-phase lower arm are controlled to the on state and the other transistors are controlled to the off state, the motor current c flows from the V-phase stator winding 31V to the U-phase stator winding 31U. The W-phase stator winding 31W is in the non-energized state, zero-crossing point of BEMF can be observed. In the following description, referred to the energization pattern c.

When executing the PWM control in the energization pattern c, the MCU 40 maintains the V-phase upper arm in the on state, executes the PWM control in the U-phase. Alternatively, the MCU 40 maintains the U-phase lower arm in the on state and executes PWM control in the V-phase. In the former case, the regeneration current flows through the V-phase upper arm and the U-phase upper arm. In the latter case, the regeneration current flows through the V-phase lower arm and the U-phase lower arm.

(d) When the MOS transistor VP of the V-phase upper arm and the MOS transistor WN of W-phase lower arm are controlled to the on state, and the other transistors are controlled to the off state, the motor current d flows from the V-phase stator winding 31V to the W-phase stator winding 31W. The U-phase stator winding 31U is de-energized and the zero-crossing point of BEMF is observable. In the following description, this energization pattern is referred to as an energization pattern d.

When executing the PWM control in the energization pattern d, the MCU 40 maintains the V-phase upper arm in the on state, executes the PWM control in the W-phase. Alternatively, the MCU 40 maintains the W-phase lower arm in the on state and executes PWM control in the V-phase. In the former case, the regeneration current flows through the V-phase upper arm and the W-phase upper arm. In the latter case, the regeneration current flows through the V-phase lower arm and the W-phase lower arm.

(e) When the MOS transistor UP of the U-phase upper arm and the MOS transistor WN of W-phase lower arm are controlled to the on state, and the other transistors are controlled to the off state, the motor current e flows from the U-phase stator winding 31U to the W-phase stator winding 31W. The V-phase stator winding 31V is in the non-energized state, zero-crossing point of BEMF can be observed.

In the following description, this energization pattern is referred to as an energization pattern e.

When executing the PWM control in the energization pattern e, the MCU 40 maintains the U-phase upper arm in the on state, and executes the PWM control in the W-phase. Alternatively, the MCU 40 maintains the W-phase lower arm in the on state and executes PWM control in the U-phase. In the former case, the regeneration current flows through the U-phase upper arm and the W-phase upper arm. In the latter case, the regeneration current flows through the U-phase lower arm and the W-phase lower arm.

(f) When the MOS transistor UP of the U-phase upper arm and the MOS transistor VN of V-phase lower arm are controlled to the on state, and the other transistors are controlled to the off state, the motor current f flows from the U-phase stator winding 31U to the V-phase stator winding 31V. The W-phase stator winding 31W is in the non-energized state, zero-crossing point of BEMF can be observed. In the following description, this energization pattern is referred to as an energization pattern f.

When executing the PWM control in the energization pattern f, the MCU 40 maintains the U-phase upper arm in the on state, executes the PWM control in the V-phase. Alternatively, the MCU 40 maintains the V-phase lower arm in the on state and executes PWM control in the U-phase. In the former case, the regeneration current flows through the U-phase upper arm and the V-phase upper arm. In the latter case, the regeneration current flows through the U-phase lower arm and the V-phase lower arm.

By controlling the inverter circuit 20 so as to flow a current to the brushless DC motor 30 in the order of the energization pattern a, b, c, d, e, f described above, the energized phase is sequentially switched, the rotor of the brushless DC motor 30 also rotates in synchronization with the rotating electromagnetic field. In this specification, for convenience, this rotation direction is referred to as a clockwise (CW) direction.

On the other hand, when switching the energization pattern in the order opposite to the above order, the energized phase also switches in the reverse order. That is, when controlling the inverter circuit 20 so as to flow a current to the brushless DC motor 30 in the order of the energization pattern f, e, d, c, b, a, the energized phase is switched in the order opposite to the above order. Therefore, the rotor of the brushless DC motor 30 also rotates in synchronization with the rotating electromagnetic field. This direction of rotation is referred as a counterclockwise rotation (CCW) direction in this specification.

Figure 4:
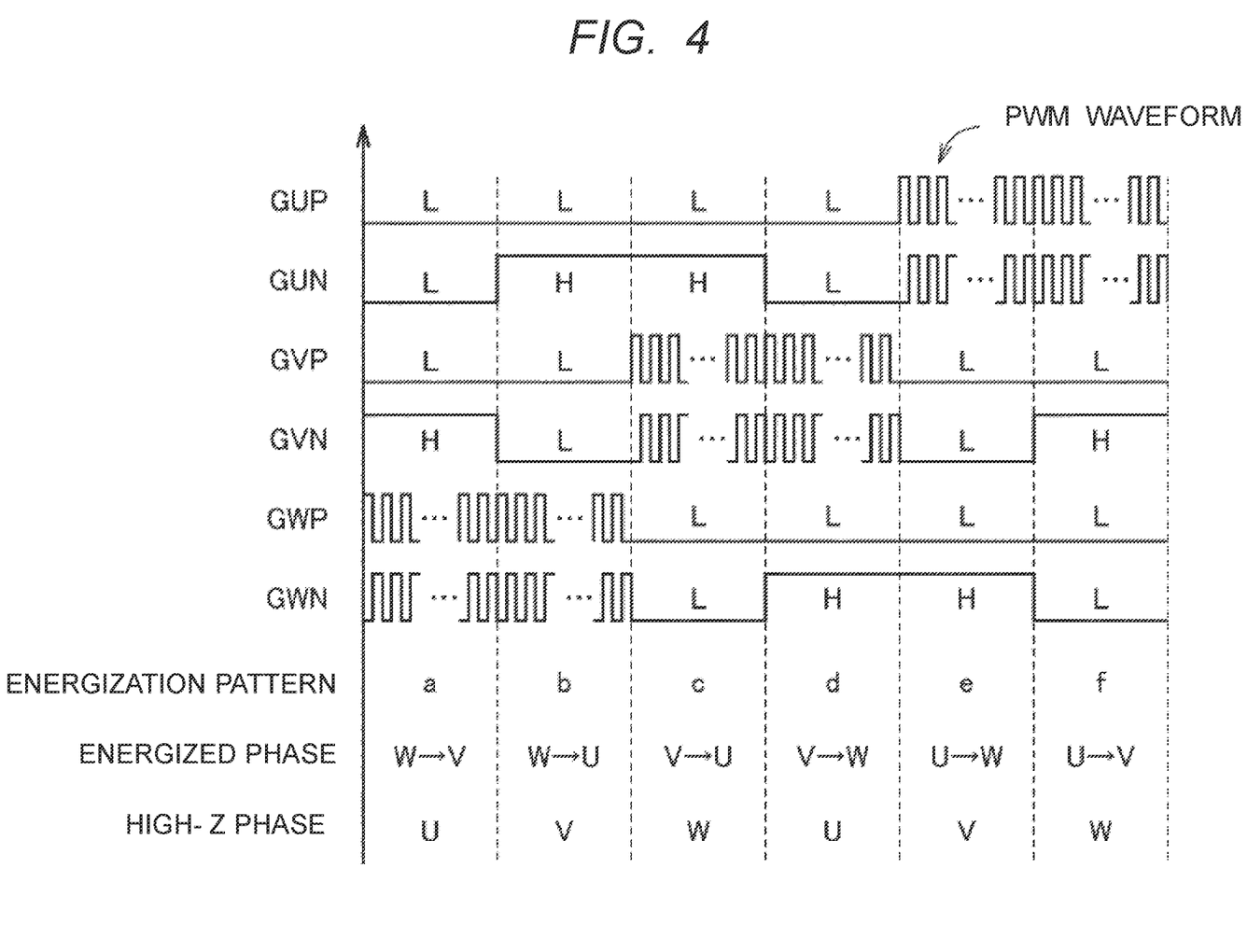
FIG. 4 is a timing chart showing a waveform of a gate control signal supplied to each MOS transistor.

FIG. 4 is a timing chart showing a waveform of a gate control signal supplied to each MOS transistor. In FIG. 4, an example of the waveform for each energization pattern when the regeneration current flows through the lower arm and does not flow through the upper arm is shown. The waveform shown in FIG. 4 is conceptual and not exactly the same as the actual waveform. When the gate applied voltage is at the high (H) level, the corresponding MOS transistor is controlled to the on state. When the gate applied voltage is at the low (L) level, the corresponding MOS transistor is controlled to the off state. In FIG. 4, the non-energized phase is referred as a high-impedance (High-Z) phase.

Summary of Motor Drive Operation

In the present embodiment, the motor driving operation is broadly divided into three modes. Hereinafter, an outline thereof will be described first.

In a first mode, the MCU 40 estimates an initial position of the magnetic pole of the rotor in a stop state. The detection of the initial magnetic pole position, for example, an inductive sense is used. In the inductive sense, for example, when a voltage to the extent that the rotor does not rotate in the six energization patterns shown in FIG. 3 is applied to the stator windings 31, the difference in current flowing through the stator windings 31 is detected. The current flowing through the stator windings 31 is detected by a voltage generated in the shunt resistor 23.

In the case of brushless DC motor 30 having a saliency, since the inductance in a d-axis direction is reduced, it is possible to detect the magnetic pole position based on the current change in the winding. Further, in the case of the brushless DC motor 30 of non-saliency, by detecting the decrease in inductance due to magnetic saturation based on the current change, it is possible to detect the magnetic pole position.

Specifically, the current I flowing through the stator windings 31 is represented by formula (1)

$$I = V/R[1-\exp(-t \cdot R/L)] \tag{1}$$

Where R represents the winding resistance of the stator windings 31, L represents the inductance, V represents the applied voltage.

In a second mode, an initial starting torque is given to the rotor by the PWM drive based on the initial magnetic pole position detected in the first mode. Applying the starting torque is also referred as a kick. In the present embodiment, in order to estimate the magnetic pole position of the rotor, mutual induced voltage in the stator windings 31 of the non-energized phase generated by the current magnetic field of the stator windings 31 of the energized phase is detected. As described later, the mutual induced voltage is obtained by the difference between the induced voltage of the non-energized phase during the voltage applying period by the PWM control, and the induced voltage of the non-energized phase of the regeneration period immediately after (or immediately before) the voltage applying period. In the present disclosure, the second mode is referred as mutual induction detection drive.

Specifically, magnetic flux φ1 is represented by formula (2).

$$\phi1 = B1S = \mu n1 I1 S \tag{2}$$

Where n1 represents the number of windings of the stator windings 31 in the energized phase, L1 represents the winding current, S represents the cross-sectional area of the coil, μ represents the permeability, and B1 represents the magnetic flux density by the current magnetic field.

Further, the magnetic flux of the non-energized phase φ^2 is represented by formula (3), and the induced voltage e^2 is represented by formula (4).

$$\phi2 \propto \phi1/K \tag{3}$$

$$e2 \propto n2 \cdot \Delta\phi2/\Delta t \tag{4}$$

Where n^2 represents the number of turns of the stator winds 31 of the non-energized phase. K is a proportionality factor that varies with the position of the rotor, and Δφ2/Δt is the time rate of change (i.e., derivative) of the magnetic flux φ2.

FIG. 4 shows an example of the voltage waveform of the gate control signal GUP, GUN, GVP, GVN, GWP, GWN in the second mode. That is, in the second mode, in order to increase the detection accuracy of the induced voltage during the regeneration period, it is desirable that the inverter circuit 20 is controlled so that the regeneration current flows through the lower arm as shown in FIG. 4, Incidentally, if it is not necessary to increase the detection accuracy, it is not necessary to flow the regeneration current only to the lower arm. For example, the regeneration current may flow through the upper arm.

In the third mode, the brushless DC motor 30 is driven based on the estimated magnetic pole position based on the zero-cross point of BEMF, When the magnitude of BEMF detected in the second mode reaches a predetermined magnitude, the driving mode shifts from the second mode to the third mode. In this disclosure, the third mode is referred as a BEMF detection drive mode.

Here, the induced voltage by BEMF refers to the voltage generated in the stator windings 31 by the rotation of the rotor. Specifically, the induced voltage V by BEMF is represented by formula (5).

$$V = Blv = 2\pi r NBl \quad (5)$$

Where B represents the magnetic flux by the permanent magnet provided in the rotor, v represents the relative speed between the surface of the rotor and the stator windings 31, r represents radius of rotation of the rotor, N represents the speed of rotation of the rotor. For simplicity, assume that the coil is a square with one side l.

As the waveform of the gate control signal GUP, GUN, GVP, GVN, GWP, GWN in the third mode, the voltage waveform of FIG. 4 or other voltage waveforms may be used. For example, the voltage waveform of FIG. 4 may be modified so that the phase for performing PWM control is not continuous.

Several modified examples of the waveforms shown in FIG. 4 are described. In the case of energization pattern b, U-phase may be PWM controlled, the gate control signal GWP may be controlled to H level, the gate control signal GWN may be controlled to L level. In the case of energization pattern d, W-phase is PWM controlled, the gate control signal GVP is controlled to H level, the waveform of FIG. 4 is changed so that the gate control signal GVN is controlled to L level. In the case of the energization pattern f, the V-phase is PWM controlled, the gate control signal GUP is controlled to H level, the waveform of FIG. 4 is changed so that the gate control signal GUN is controlled to L level. In this case, the waveform of energization patterns a, c, e are not changed.

Details of Motor Drive Operation

Figure 5:
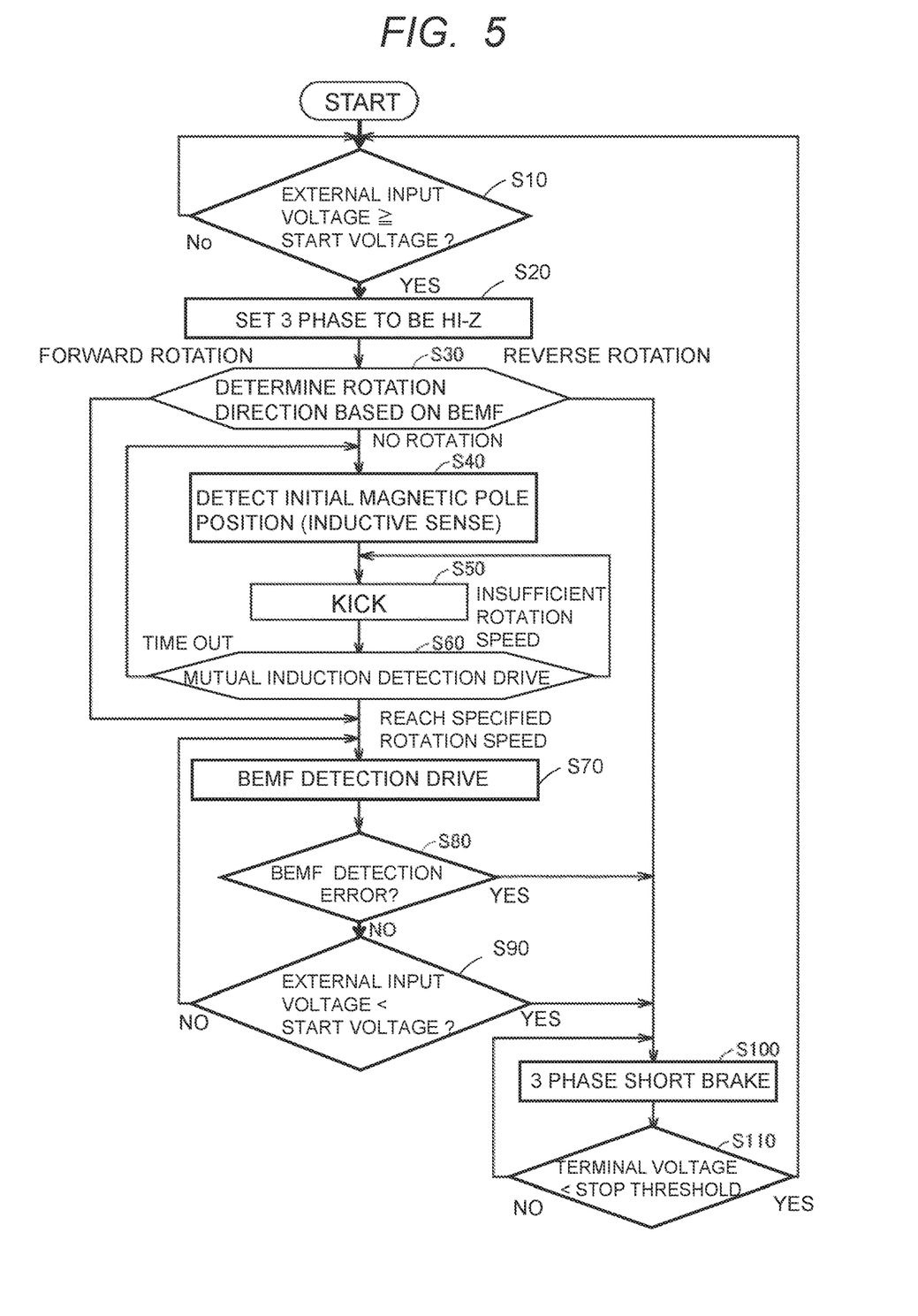
FIG. 5 is a flowchart showing an example of a driving process of the brushless DC motor.

FIG. 5 is a flowchart showing an example of a driving process of the brushless DC motor. Hereinafter, with reference to FIGS. 1 and 5, a description will be given of the driving process of the brushless DC motor 30. The detected value of the external input voltage VM is input to the MCU 40.

In step S10 of FIG. 5, the MCU 40 determines whether the external input voltage VM is equal to or higher than a preset start voltage. The MCU 40 proceeds the process to step S20 when the external input voltage VM is equal to or higher than the start voltage.

In step S20, the MCU 40 sets the gate control signal GUP, GUN, GVP, GVN, GWP, GWN to a low level. This causes the MOS transistor UP, UN, VP, VN, WP, WN to be in all off-state (high-impedance state).

In the next step S30, the MCU 40, by detecting the induced voltage (BEMF) of each phase while switching on the three phases of the switching circuit 61 in order, to detect the rotation direction of the rotor. The MCU 40, when the rotation direction of the rotor is the forward rotation that is a direction by the operation command value 11, the process proceeds to step S70 (BEMF detection drive). The MCU 40, when the rotation direction of the rotor is the reverse rotation that is a reverse direction to the direction specified by the operation command value 11, the process proceeds to step S100 (3 phase short brake). The MCU 40, when the magnitude of BEMF is equal to or less than a threshold, the rotor is determined to be no rotation, the process proceeds to step S40.

In step S40, the MCU 40 detects the initial magnetic pole position by using, for example, the inductive sense.

In the next step S50, the MCU 40, based on the initial magnetic pole position detected in step S40, applies a voltage to the stator windings 31 in the energization pattern the initial torque is increased most. For example, in step S40, it is assumed that the smallest self-inductance is detected in the energization pattern d. In this case, to rotate in the CW direction, the MCU 40 controls the inverter circuit 20 so as to apply a voltage to the stator windings 31 in the energization pattern f.

In step S60, the MCU 40 executes the mutual induction detection drive (mode 2). Details of the mutual induction detection drive will be described later with reference to FIGS. 7 to 9.

In step S60, when the MCU 40 determined that the rotation speed is insufficient, the process returns to step S50, and applies an initial torque in the next energization pattern. If the rotation of the rotor cannot be detected even if a kick time exceeds the maximum kick time Tmax, the MCU 40 determines a timeout. In this case, the MCU 40 detects the initial magnetic pole position of the rotor by returning the process to step S40. When detecting that the rotation speed of the rotor has reached the specified rotation speed, the MCU 40 proceeds process to step S70.

In step S70, the MCU 40 executes BEMF detection drive (mode 3). Specifically, based on the zero-cross point of BEMF to be detected in the non-energized phase, the MCU 40 estimate the position and speed of the rotor. The MCU 40 drives the brushless DC motor 30 by PWM control so that appropriate torque is applied to the rotor based on the estimated the position and speed of the rotor.

When no BEMF detection error is detected (NO in step S80), and the external input voltage VM is equal to or higher than the start voltage (NO in step S90), the MCU 40 continues to execute the step S70. When BEMF detection error is detected (YES in step S80), and the external input voltage VM is less than the start voltage (YES in step S90), the MCU 40 proceed the process to step S100.

In step S100, the MCU 40 disconnects the external input voltage VM so that the external input voltage VM is not provided to the first power supply node 21. The MCU 40 then sets the gate control signal GUP, GUN, GVP, GVN, GWP, GWN to H-level so that all MOS-transistor UP, UN, VP, VN, WP, WN are conductive. Thus, three phase short brake is applied to the brushless DC motor 30.

In step S110, the MCU 40 sets the phase select signal SLU, SLV, SLW so that any one phase of the switch circuit 61 is turned on. In this state, for example, when the MCU 40 controls so that U-phase of the switch circuit 61 is turned on, the MCU 40 monitors a terminal voltage between the output node TU and the virtual neutral point 72. Until the magnitude of the terminal voltage (or the maximum value) is equal to or less than the stop threshold set in advance, the MCU 40 continues to execute the three phases short brake (step S100). When the magnitude (or maximum value) of the terminal voltage becomes equal to or less than the stop threshold (YES in step S110), the MCU 40 returns the process to the first step S10.

Figure 6:
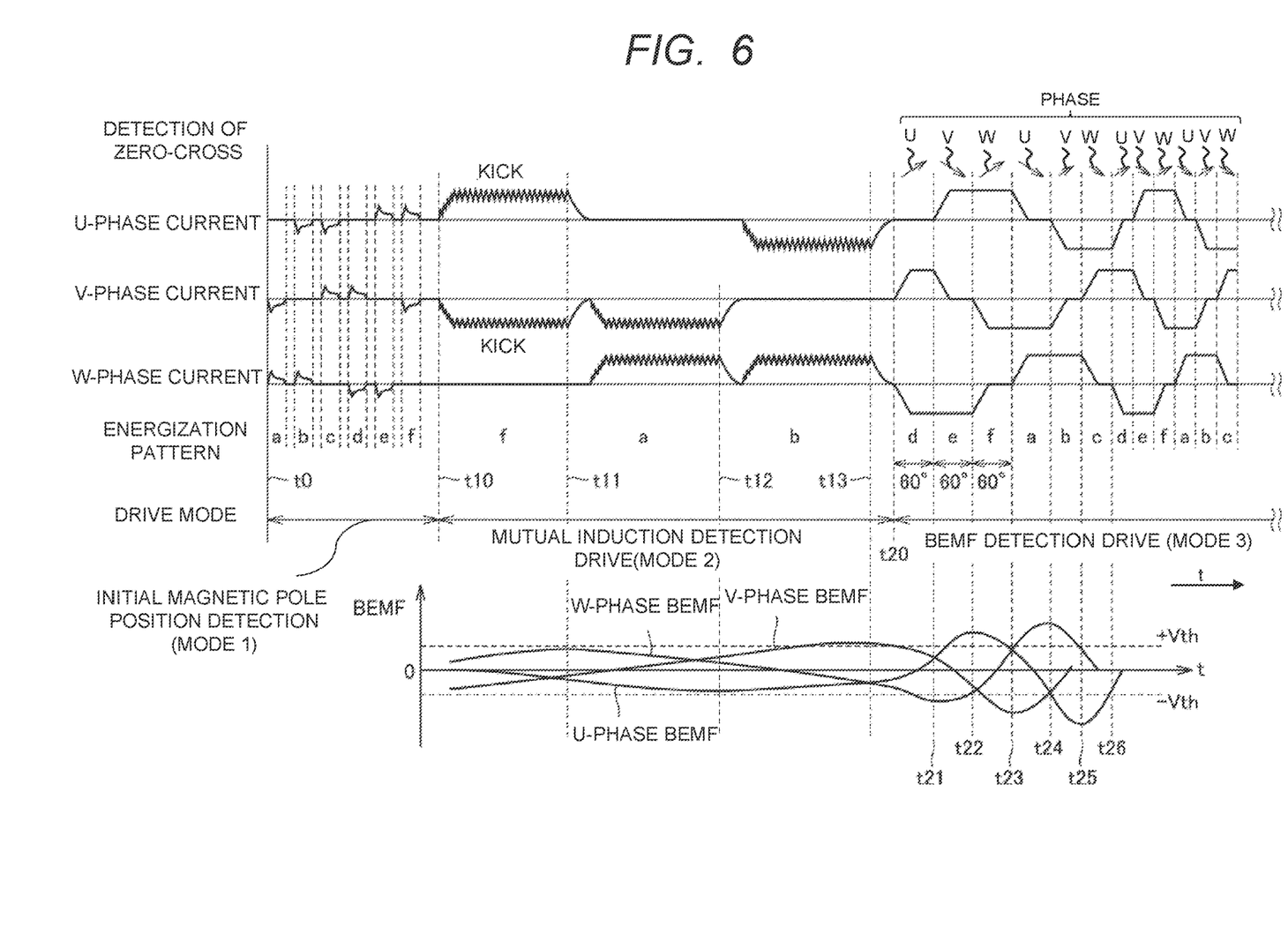
FIG. 6 is an example of a current waveform of each phase of the motor drive system of FIG. 1.

FIG. 6 is an example of a current waveform of each phase of the motor drive system of FIG. 1. The magnitude of the applied current and the current applying time may have been deformed to facilitate understanding of the figure and are not proportional to the actual current.

Referring to FIG. 6, from time t0 to time t10 corresponds to the mode 1 (initial magnetic pole position detection). From time t10 to time t20 corresponds to mode 2 (mutual induction detection drive). Time t20 and later correspond to mode 3 (BEMF detection drive).

At time t0 to time t10, the MCU 40 applies a voltage to the stator windings 31 in the order of the six energization patterns a to f described in FIG. 3 by controlling the inverter circuit 20. In this case, the voltage applied to the stator windings 31 and its applying time is limited to the extent that the rotor does not rotate. The MCU 40 detects the current flowing through the stator windings 31 in the respective energization patterns (i.e., the voltage generated in the shunt resistor 23). Based on the detection results, the MCU 40 determines the energization pattern when the self-inductance is lowest.

At time t20 from time t10, the MCU 40 applies a start torque to the brushless DC motor 30 by controlling the inverter circuit.

First, at time t10, the MCU 40 applies a voltage based on the PWM control to the stator windings 31 in the energization pattern most applied torque is increased based on the position of the rotor detected by the inductive sense. In the case of FIG. 6, first, a voltage is applied in the energization pattern f. The voltage applying period of the PWM control, a current flows from the U-phase upper arm to the V-phase lower arm through the stator windings 31. The regeneration period of the PWM control, the regeneration current flows in the direction of the V-phase lower arm from the U-phase lower arm through the stator windings 31. The MCU 40 detects the induced voltage of the W-phase that is the non-energized phase by the detector 60. The MCU 40 estimates the mutually induced voltage and BEMF based on the detected induced voltage of the non-energized phase. Specific methods for estimating mutually induced voltage and VEMF will be discussed below with reference to FIGS. 7-9.

At time t11, the mutual induced voltage detected in the W-phase of the non-energized phase becomes substantially zero (i.e., the absolute value of the mutually induced voltage is smaller than the threshold value). At this time, since the absolute value of BEMF detected by the W-phase of the non-energized phase is not equal to or greater than the threshold voltage Vth, the MCU 40 switches the energization pattern. That is, the MCU 40 applies a voltage based on the PWM control to the stator windings 31 in the next energization pattern a by controlling the inverter circuit 20. In the energization pattern a, during the voltage applying period of the PWM control, a current flows from the W-phase upper arm to the V-phase lower arm through the stator windings 31. The regeneration period of the PWM control, the regeneration current flows in the direction of the V-phase lower arm from the W-phase lower arm through the stator windings 31. The MCU 40 detects the induced voltage of the U-phase is the non-energized phase by the detector 60.

At time t12, mutual induced voltage detected in the U-phase of the non-energized phase becomes substantially zero (i.e., the absolute value of the mutually induced voltage is smaller than the threshold value). At this time, since the absolute value of BEMF detected by the U-phase of the non-energized phase is not equal to or greater than the threshold voltage Vth, the MCU 40 switches the energization pattern. That is, the MCU 40 applies a voltage based on the PWM control to the stator windings 31 in the next energization pattern b by controlling the inverter circuit 20. In the energization pattern b, during the voltage applying period of the PWM control, a current flows from the W-phase upper arm to the U-phase lower arm through the stator windings 31. During the regeneration period of the PWM control, the regeneration current flows in the direction of the U-phase lower arm from the W-phase lower arm through the stator windings 31. The MCU 40 detects the induced voltage of the V-phase that is the non-energized phase by the detector 60.

At time t13, mutual induced voltage detected in the V-phase of the non-energized phase becomes substantially zero (i.e., the absolute value of the mutually induced voltage is smaller than the threshold value). At this time, since the absolute value of BEMF detected by the V-phase of the non-energized phase is equal to or greater than the threshold voltage Vth, the MCU 40 switches the drive mode from mode 2 to mode 3 at the next time t20.

At time t20, the MCU 40 applies a voltage based on the PWM control to the stator windings 31 in the energization pattern d by controlling the inverter circuit 20. During energization by the energization pattern d, the MCU 40 detects the zero-crossing point of BEMF of the U-phase of the non-energized phase by the detector 60. BEMF in mode 3 is detected via CR filter.

At a time t21 elapsed 30 degrees at an electric angle from the detection time of the zero-cross point, the MCU 40 switches the energization pattern from the energization pattern d to the energization pattern e. Hereinafter, similarly, the energization pattern is switched at each time t22 to t26 based on detection of the zero-cross point of BEMF of the non-energized phase.

Detailed Operation of Mutual Induction Detection Drive

Figure 7:
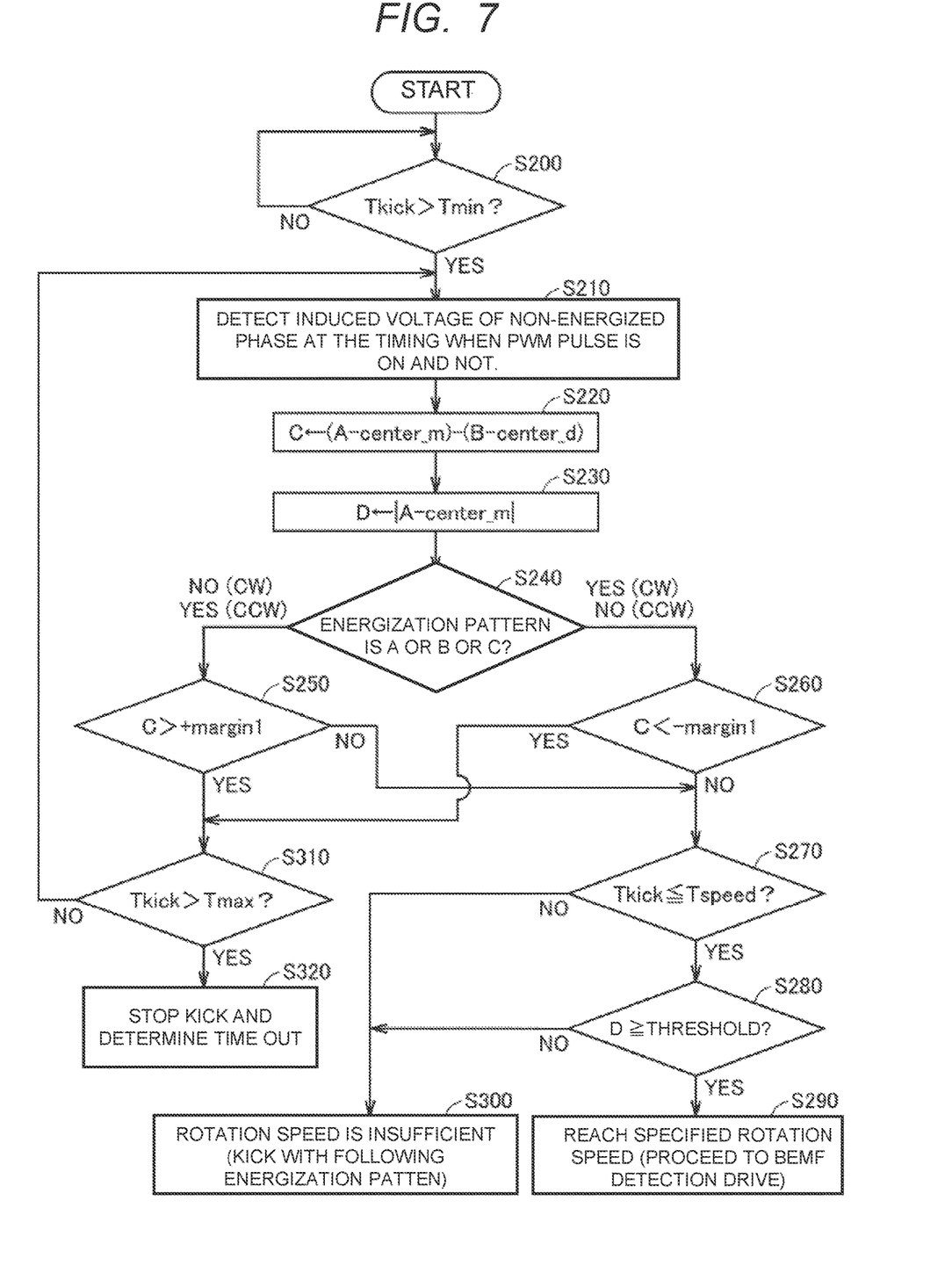
FIG. 7 is a flowchart showing a detailed operation of mutual induction detection drive in step S60 of FIG. 5.

FIG. 7 is a flowchart showing a detailed operation of the mutual induction detection drive in step S60 of FIG. 5.

In step S200 of FIG. 7, the MCU 40 determines whether the elapsed time Tkick from the kick start (referred to as kick time Tkick) exceeds a predetermined minimum kick time Tmin. The MCU 40 proceeds the process to the step S210 if the kick time Tkick exceeds the smallest kick time Tmin (YES at the step S200).

In a step S210, the MCU 40 detects the induced voltage A of the non-energized phase at the timing when the PWM pulse is on. The MCU 40 detects the induced voltage B of the non-energized phase at the timing when the PWM pulse is then off. Variable C, which is a value obtained by subtracting the induced voltage B from the induced voltage A corresponds to the induced voltage based on mutual induction. Incidentally, when the rotor is rotating, each of the induced voltage A and the induced voltage B, it also includes a BEMF. By subtracting the induced voltage B from the induced voltage A, BEMF is canceled.

More precisely, an offset value center_m of the differential amplifier 63 near the half of the external input voltage VM, and an offset value center_d of the differential amplifier 63 near the ground voltage GND are considered. In step S220, the MCU 40 calculates the variable C by formula (6).

$$(A-\text{center\_m})-(B-\text{center\_d}) \qquad (6)$$

The MCU 40 stores the calculated C in the memory.

In the following step S230, the MCU 40 stores the absolute value of (A−center_m) in the memory as the variable D. Instead of the absolute value of (A−center_m), the absolute value of (B−center_d) may be stored in the memory as a variable D. When the induced voltages based on mutual induction (i.e., the variables C) are 0, the absolute value of (A−center_m) or the absolute value of (B−center_d) will be equal to the absolute value of BEMF.

In the following step S240, the MCU 40 determines whether the energization pattern is either of a or c or e, or either of b or d or f. As an example, the MCU 40 proceeds the process to step S250 if the rotation direction of the rotor is the CW direction described in FIG. 3 and the energization pattern is b or d or f. The MCU 40 proceeds the process to step S260 if the rotation direction of the rotor is CW direction and the energization pattern is a or c or e. The MCU 40 proceeds the process to step S260 if the rotation direction of the rotor is is the CCW direction described in FIG. 3, and the energization pattern is b or d or f. The MCU 40 proceeds the process to step S250 if the rotation direction of the rotor is the CCW direction and the energization pattern is a or c or e. Since the CW direction and the CCW direction are for convenience, the processing may proceed in the opposite direction to the above.

First, the process proceeds to the step S250 is described. When the variable C calculated by the above formula (6) is positive at the kick start time point, the process proceeds to the step S250. In the step S250, the MCU 40 determines whether or not the variable C is greater than the threshold voltage +margin1.

The MCU 40 processes to step S310 if the variable C is greater than the +margin1 (YES in step S250). In step S310, if the kick time Tkick is greater than the maximum kick time Tmax (YES in step S310), the MCU 40 stops the kick and determines that it's time out (step S320). On the other hand, in step S310, if the kick time Tkick is equal to or less than the maximum kick time Tmax, the MCU 40 returns the process to step S210.

In step S250, if the variable C is equal to or smaller than margin1 value (NO in step S250), the MCU 40 proceeds the process to step S270. In step S270, the MCU 40 determines whether or not the kick time Tkick is equal to or less than the target kick time Tspeed. When the kick time Tkick exceeds the target kick time Tspeed (NO in step S270), the MCU 40 determines that the rotation speed is insufficient (step S300). In this instance, the MCU 40 returns the process to S50 of FIG. 5, and starts kicking with the following energization pattern.

On the other hand, when the kick time Tkick in the step S270 is equal to or less than the target kick time Tspeed (YES in the step S270), the MCU 40 proceeds the process to the step S280. In the following step S280, the MCU 40 determines whether or not the variable D stored in the step S230 is equal to or greater than a threshold value. The variable D is equal to or greater than the threshold corresponds to the absolute value of BEMF being equal to or greater than the threshold voltage Vth. When the variable D is equal to or greater than the threshold value (YES in step S280), the MCU 40 determines that the variable D has reached the specified rotation speed (step S300). In this instance, the MCU proceeds the process to BEMF detection drive in S70 of FIG. 5.

Next, the case where the process proceeds to step S260 as a result of the determination in step S240 is described. In this case, the variable C calculated by the above equation (6) corresponds to a negative case at the kick start time. In step S260, the MCU 40 determines whether the variable C is less than the threshold voltage −margin1. The MCU 40 proceeds the process to step S310 if the variable C is less than −margin1 (YES at step S260). Since the subsequent process has been described in step S250, the explanation will not be repeated. If the variable C is greater than or equal to −margin1 value (NO in step S260), the MCU 40 proceeds the process to step S270. Since the subsequent process has been described in step S250, the explanation will not be repeated.

In the above, the MCU may determine whether or not the absolute value of the variable C is equal to or less than the threshold voltage of +margin1 without dividing the process according to the energization patterns. In this instance, instead of the steps S240, S250, S260, a step determining whether or not the absolute value of the variable C is equal to or less than +margin1 is provided. Specifically, the MCU 40 proceeds the process to step S310 when the absolute value of the variable C is larger than +margin1, and proceeds the process to step S270 when the absolute value of the variable C is equal to or smaller than +margin1.

Example of Mutual Induction Detection Drive

Figure 8A:
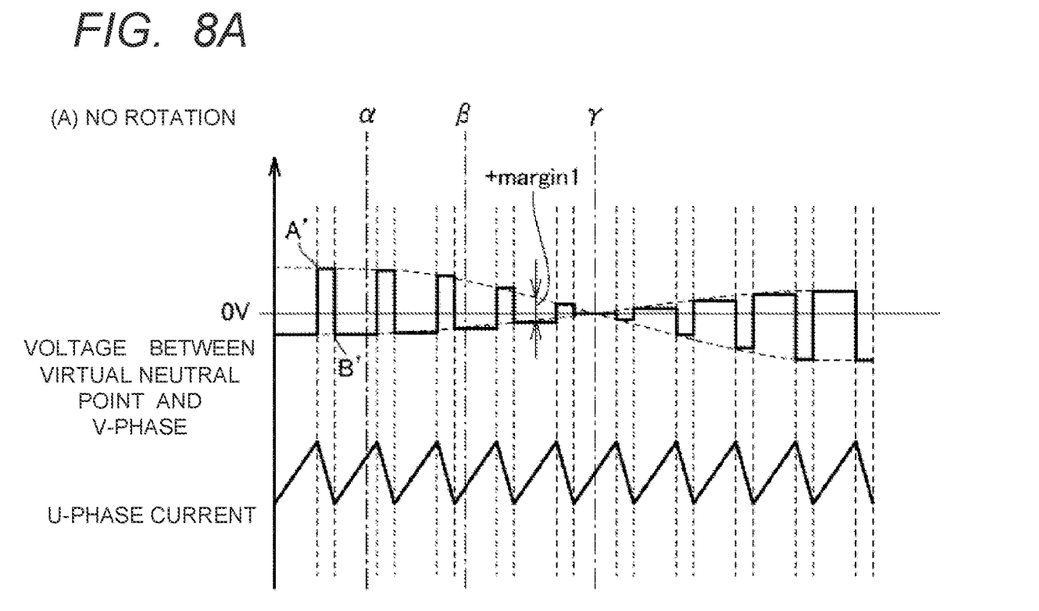
FIGS. 8A and 8B are examples of output waveform of a differential amplifier of FIG. 1 in the mutual induction detection drive.
Figure 8B:
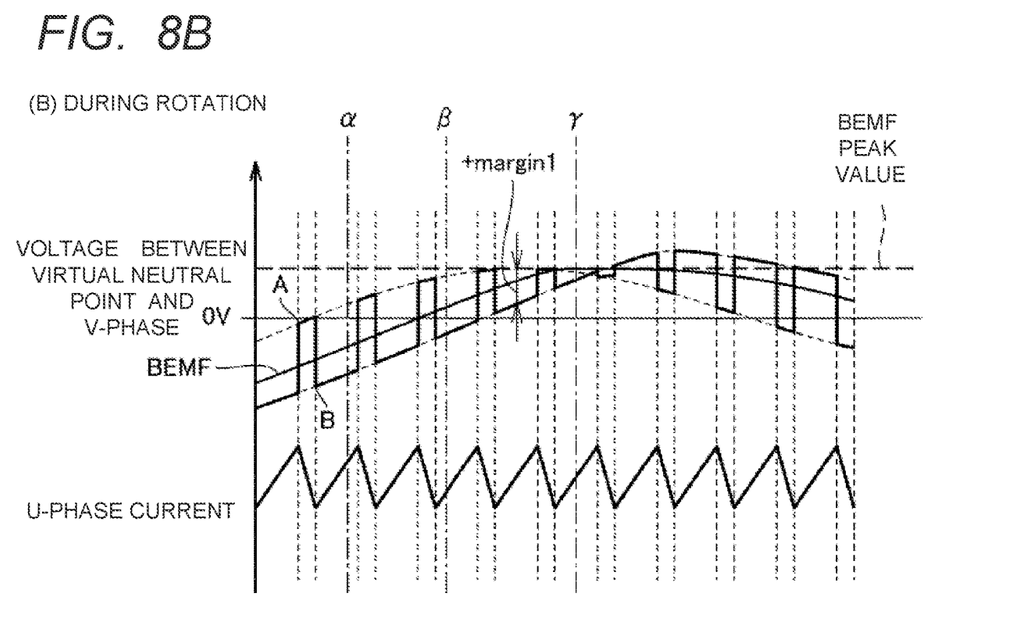

FIGS. 8A and 8B are examples of an output waveform of a differential amplifier of FIG. 1 in the mutual induction detection drive. In FIGS. 8A and 8B, in the case of the energization pattern b, the waveform of the voltage between the output node TV of the V-phase which is the non-energized phase and the virtual neutral point 72, and the waveform of the U-phase current are shown. FIG. 8A shows a case where the rotor is not rotating, and FIG. 8B shows a case where the rotor is rotating. The horizontal axis of each graph corresponds to the position of the rotor. That is, FIGS. 8A and 8B show a waveform synthesizing output waveforms having different position of the rotor. The more to the right, the output waveform at the position where the rotor rotates in more CW direction is shown.

Referring to FIG. 8A, the voltage A' and voltage B' are detected, the voltage A' being a voltage when the voltage applied state in the PWM control, and the voltage B' being a voltage when the regeneration current immediately thereafter is flowing. From the formula (6) above, the variable C is calculated by formula (7)

$$C=(A'-\text{center}\_m)-(B'-\text{center}\_d) \quad (7)$$

By detecting when the positive and negative of the above variable C is changed, it is possible to detect the position of the rotor every electrical angle 60 degrees. The γ point corresponds to when the variable C=0.

Referring to FIG. 8B, the voltage A in a voltage applied state in the PWM control, and the voltage B when the regeneration current flows immediately after the voltage applied state are detected. From the formula (6) above, the variable C is calculated by formula (8)

$$C=(A-\text{center}\_m)-(B-\text{center}\_d) \quad (8)$$

Here, the voltage waveform of FIG. 8B when the rotor is rotating, it can be considered that BEMF is added to the voltage waveform of FIG. 8A the rotor is not rotating. Therefore, the formula (8) above is rewritten like below.

$$C=(A'+\text{BEMF}-\text{center}\_m)-(B'+\text{BEMF}-\text{center}\_d) \quad (9)$$

Since BEMF is cancelled, the above formula (9) becomes the same as the above formula (7). That is, the value of the variable C when the rotor is stopped is equal to the value of the variable C when the rotor is rotating. Therefore, by determining the polarity of the variable C, the same accuracy even when the rotor is rotating even when the rotor is stopped, it is possible to detect the position of the rotor. When the variable C is 0, a formula (10) is established.

$$A'-\text{center}\_m=B'-\text{center}\_d=0 \quad (10)$$

Therefore, the absolute value of (A−center_m) or the absolute value of (B−center_d) calculated as the variable D above is equal to the absolute value of BEMF. That is, the peak value level of the BEMF can be detected.

In FIGS. 8A and 8B, margin1 is a determination threshold for determining the polarities of C. That is, in the polarity determination of the actual variable C, the position of the rotor is detected at a position before the γ point in FIGS. 8A and 8B. Since the waveform of BEMF is close to a sinusoidal waveform, it does not affect the detection accuracy of BEMF even if it deviates about 30 degrees at an electric angle from the position of the rotor when the variable C=0.

Figure 9A:
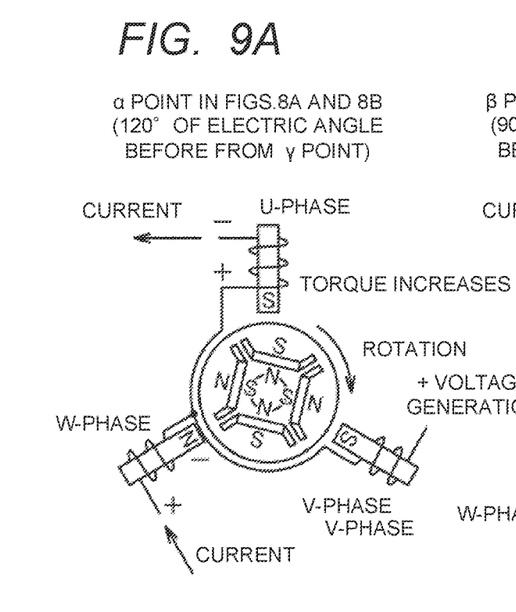
FIGS. 9A, 9B and 9C are diagrams for explaining a position of the rotor at the positions of α point, β point, and γ point in FIGS. 8A and 8B.
Figures 9B, 9C:
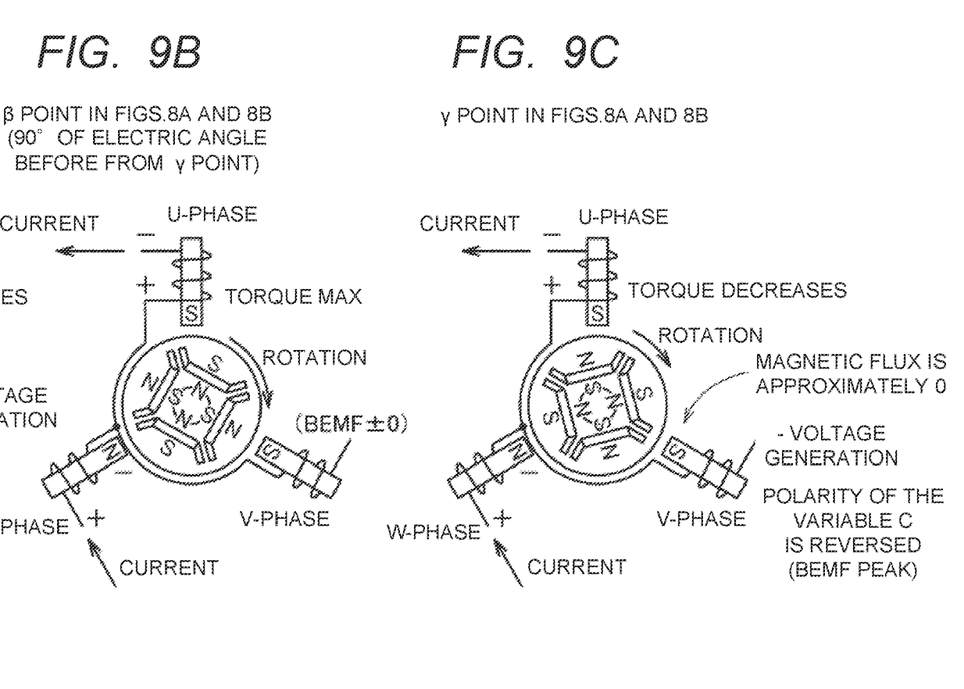

FIGS. 9A, 9B and 9C are diagrams for explaining the position of the rotor at the positions of the α point, the β point, and the γ point in FIGS. 8A and 8B. In FIGS. 9A, 9B and 9C, cross-sectional view of the brushless DC motor 30 when the pole logarithm is 2 is shown conceptually. FIG. 9A shows the case of the α point, and FIG. 9B shows the case of the β point, and FIG. 9C shows the case of the γ point in FIGS. 8A and 8B respectively. In the case of energization pattern b, the winding current flows from the W-phase to the U-phase, the voltage of the V-phase is the non-energized phase is detected.

As shown in FIG. 9A, the α point represents the position of the rotor 120 degrees of electric angle before from γ point. In this case, + voltage is generated in the V-phase.

As shown in FIG. 9B, the β point indicates the position of the rotor 90 degrees of electric angle before from γ point. In this case, BEMF detected in the V phase is approximately 0. As shown in FIG. 9C, the γ point indicates the position of the rotor when the variable C, i.e., the induced voltage based on mutual induction is 0.

Effect

As described above, according to the brushless DC motor 30 of the present disclosure, the position of the rotor is detected by utilizing the induced voltage generated in the non-energized phase by mutual induction based on the current magnetic field of the energized phase. Thus, prior to the sensorless control based on the detection of the zero-cross point of BEMF becomes feasible, at the time of initial start of the brushless DC motor 30, it is possible to detect the position of the rotor.

Here, by obtaining the difference between the induced voltage of the non-energized phase during the voltage applying period of the PWM control, and the induced voltage in the non-energized phase immediately after or before the induced voltage during the regeneration period, it is possible to detect the position of the rotor without being affected by BEMF. Therefore, in the case where the rotor is no rotation and the case of the rotor is in rotation, it is possible to use the same determination threshold to detect the timing at which the difference is 0.

In addition, the magnitude of BEMF can be detected from the mutual induced voltage when the above difference is nearly zero. Until now, large-constant CR filtering was required to detect BEMF when PWM-frequency is lower, but present embodiment can detect with high accuracy without using CR filtering.

Although the invention made by the present inventor has been specifically described based on the embodiment, the present invention is not limited to the embodiment described above, and it is needless to say that various modifications can be made without departing from the gist thereof.

What is claimed is:
1. A semiconductor device for controlling a three-phase motor, the semiconductor device comprising:
   a detection circuit coupled to output nodes corresponding to each phase of the three-phase motor, and configured to detect a voltage generated in the output node of a non-energized phase of the three-phase motor; and
   a controller configured to:
      at a time of starting the three-phase motor, apply a drive voltage to any two phases of the three-phase motor based on an estimated magnetic pole position of a rotor in a stop state; and
      estimate a position of the rotor based on a difference voltage between i) a voltage generated in the output node of the non-energized phase during a drive voltage applying period and ii) a voltage generated in the output node of the non-energized phase during a regeneration period immediately after or immediately before the drive voltage applying period,
   wherein, when an absolute value of the difference voltage is less than or equal to a first threshold, the controller switches the phase the drive voltage applying.

2. The semiconductor device according to claim 1, wherein the drive voltage is based on pulse-width modulation.

3. The semiconductor device according to claim 1, wherein, when the absolute value of the difference voltage is equal to or less than the first threshold, the controller estimates an absolute value of a detected voltage by the detection circuit as an absolute value of a back electromotive force.

4. The semiconductor device according to claim 3, wherein, when the absolute value of the estimated back electromotive force is greater than or equal to a second threshold value, the controller shifts to a drive mode controlling the three-phase motor based on a zero-crossing point of a detected voltage by the detection circuit.

5. The semiconductor device according to claim 3, wherein, when the absolute value of the estimated back electromotive force is greater than or equal to a second threshold value, and a voltage application time from a start time of applying the drive voltage to the two phases of the three-phase motor is less than or equal to a threshold time, the controller shifts to a drive mode controlling the three-phase motor based on a zero-crossing point of a detected voltage by the detection circuit.

6. The semiconductor device according to claim 3, wherein, when a voltage application time from a start time of applying the drive voltage to the two phases of the three-phase motor exceeds a threshold time, and when the absolute value of the difference voltage is not less than or equal to the first threshold, the controller stops applying the drive voltage.

7. The semiconductor device according to claim 1, wherein the controller estimates the position of the magnetic pole of the rotor in the stop state by an inductive sense.

8. The semiconductor device according to claim 1, the detection circuit further comprising,
   a switch circuit configured to select at least one phase of the three-phase, and
   a differential amplifier configured to amplify a difference between a voltage of the output node of the phase selected by the switch circuit and a voltage of a virtual neutral point.

9. The semiconductor device according to claim 1, further comprising an inverter circuit,
   wherein the controller controls the inverter circuit so that a regeneration current flows through a lower arm and does not flow through an upper arm during the regeneration period.

10. A motor drive system comprising:

a three-phase motor;

an inverter circuit configured to drive the three-phase motor, and comprising output nodes corresponding to each phase of the three-phase motor;

a detection circuit coupled to the output nodes, and configured to detect a voltage generated in the output node of a non-energized phase of the three-phase; and a controller configured to:

at a time of starting the three-phase motor, causing the inverter circuit to apply a drive voltage to any two phases of the three-phase motor based on an estimated magnetic pole position of a rotor in a stop state; and estimate a position of the rotor based on a difference voltage between i) a voltage generated in the output node of the non-energized phase during a drive voltage applying period and ii) a voltage generated in the output node of the non-energized phase during a regeneration period immediately after or immediately before the drive voltage applying period, wherein, when an absolute value of the difference voltage is less than or equal to a first threshold, the controller switches the phase the drive voltage applying.

11. A motor starting method comprising:

estimating a magnetic pole position of a rotor in a stop state at a time of starting a three-phase motor;

applying a drive voltage to any two phases of the three-phase motor based on the estimated magnetic pole position of the rotor in the stop state;

estimating a position of the rotor based on a difference voltage between i) an induced voltage generated in non-energized phase during a drive voltage applying period and ii) an induced voltage generated in non-energized phase during a regeneration period immediately after or immediately before the drive voltage applying period; and switching the phase the drive voltage applying when an absolute value of the difference voltage is less than or equal to a first threshold.

12. The motor starting method according to claim 11, wherein the drive voltage is based on pulse width modulation.

13. The motor starting method according to claim 11, further comprising:

estimating an absolute value of an induced voltage as an absolute value of a back electromotive force, the induced voltage being a voltage generated in a non-energized phase when the absolute value of the difference voltage is less than or equal to the first threshold value.

14. The motor starting method according to claim 13, further comprising:

shifting to a drive mode controlling an inverter circuit based on a zero-cross point of the induced voltage in the non-energized phase when the absolute value of the estimated back electromotive force is greater than or equal to a second threshold.

15. The motor starting method according to claim 13, further comprising:

shifting to the drive mode controlling an inverter circuit based on a zero-crossing point of the induced voltage in non-energized phase when the absolute value of the estimated back electromotive force is greater than or equal to a second threshold value, and when a voltage application time from a start time of applying the drive voltage to the two phases of the three-phase motor is equal to or less than a threshold time.

16. The motor starting method according to claim 13, further comprising:

stopping applying the drive voltage when a voltage application time from a start time of applying the drive voltage to the two phases of the three-phase motor exceeds a threshold time, and when the absolute value of the difference voltage is not less than or equal to the first threshold.

* * * * *